July 16, 1929.    M. CHARLES    1,721,372
HYDRAULIC BRAKE SYSTEM
Filed May 21, 1927
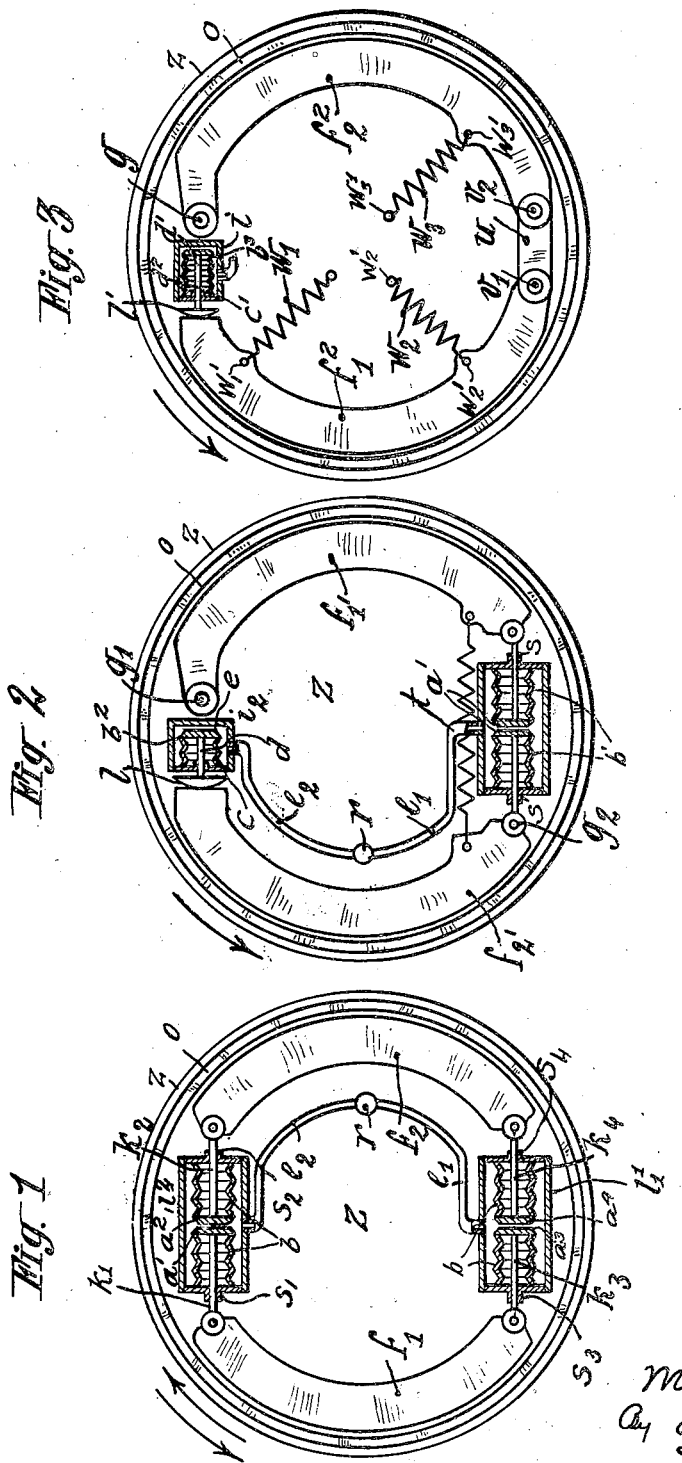

Patented July 16, 1929.

1,721,372

UNITED STATES PATENT OFFICE.

MAURICE CHARLES, OF COURBEVOIE, FRANCE.

HYDRAULIC BRAKE SYSTEM.

Application filed May 21, 1927, Serial No. 193,207, and in France September 1, 1926.

The present invention forms a companion to my co-pending application Serial No. 35,740, filed June 8, 1925, and relating to hydraulic brake systems. The object of my invention is to provide an improved mechanism for the control of the brake shoes situated within the brake drums of the wheels.

Other objects of my invention will be obvious to those skilled in the art by reference to the accompanying drawings, in which—

Fig. 1 is a front elevation of my device with parts in section;

Fig. 2 is a view similar to Fig. 1 of a modification; and

Fig. 3 is a view similar to Fig. 1 of another modification.

In Fig. 1 the liquid is brought in through a conduit $r$ and is led through pipes $e_1$ and $e_2$ and into receivers $i^1{}_1$ and $i^2{}_2$ which are of the double piston type, each of which is provided with a pair of pistons $a_1$, $a_2$ and $a_3$, $a_4$ respectively. Each of said pistons is connected to an end of its respective receiver by means of a fluid tight sylphon or bellows $b$. Each piston $a_1$, $a_2$, $a_3$, $a_4$ carries a piston rod $k_1$, $k_2$, $k_3$ and $k_4$ guided in bearings $s_1$, $s_2$, $s_3$ and $s_4$ and a pair of brake shoes $f_1$ and $f_2$ are directly pivoted thereon.

From the foregoing it will be obvious that if the pressure of the fluid arriving at $r$ is increased, the bellows are compressed thereby giving a displacement to the piston rods which moves the brake shoes in contact with the brake drum O.

The principal feature of this embodiment resides in the fact that the displacement of the brake shoes is accomplished by sliding their extremities and not by their rotation about a pivot point.

Furthermore, due to the fact that the assembly produces perfect self-equilibrium, the cushions of liquid which separate the two brake shoes permit one shoe to take a longer stroke than the other if necessary due to any of the well known causes such as bad regulation or a difference in wear on the brakes.

In Fig. 2 the liquid is led in through a conduit $r$ and conducted by means of conduits $e_1$ and $e_2$, as before, into receivers $i_1$ and $i_2$.

Receiver $i_1$ is identical to those previously described in connection with Fig. 1 and is provided with pistons $a'$ carrying piston rods $k'$ extending through bearings $s$, and fluid tight bellows $b'$. Receiver $i_2$ is provided with a single piston $e$ carrying a piston rod $d$ extending through a bearing $c$, and fluid tight bellows $b^2$. The parts in receiver $i_2$ are arranged similarly to the construction previously described with the exception that one end of the receiver is closed and cooperates with the single piston contained therein.

Brake shoes $f'_1$ and $f'_2$ are pivoted to piston rods $k'$ of receiver $i_1$ at one end. The shoe $f'_1$ pivots about a fixed stud $g_1$ at the other end while the shoe $f'_2$ is adapted to be displaced by an abutment $l$ carried by the piston rod $d$ of cylinder $i_2$ at its other end.

A spring $t$ interconnects the brake shoes $f'_1$ and $f'_2$ and is of sufficient strength to oppose the movement of said shoes toward the drum O until a high pressure has been established in receiver $i_1$.

The arrangement is such that the pistons $a'$ are separated by only a thin sheet of operating fluid when the pressure is reduced and when the pressure of the said fluid is increased sufficiently to overcome the action of spring $t$ the said thin sheet increases in volume and moves the pistons away from each other which action is augumented by the beveled edges provided on the said pistons as shown.

With this arrangement if a low pressure is transmitted through $r$, the shoe $f_2$ turns about $g_2$ and enters into contact with the brake drum.

When the pressure becomes sufficient to overcome the tension of spring $t$, brake shoe $f'_2$ is moved laterally as described in connection with Fig. 1, thus increasing the braking effort thereof on drum O. At the same time shoe $f'_1$ pivots about the stud $g^1$ and further increases the braking effort by coming into contact with drum O.

In the embodiment shown in Fig. 3 the liquid is led directly to a receiver $i$ similar to receiver $i_2$ of Fig. 2 and provided with a piston $d'$, piston rod $d^2$, bearing $c'$, and bellows $b^3$ all of which is arranged as the corresponding elements, above described in connection with Fig. 2. The variations in pressure are transmitted to the $f^2{}_1$ by means of an abutment $l$ carried by the extremity of piston rod $d'$ as before.

A pair of brake shoes $f^2{}_1$, $f^2{}_2$ are pivotally interconnected at one end by means of a link $u$ and studs $v_1$, $v_2$. Shoe $f^2{}_2$ is pivoted at its other extremity to a stud $g$. The other extremity of shoe $f^2{}_1$ is adapted to contact with abutment $l'$.

Brake shoe $f^2{}_1$ is provided with springs $W_1$ and $W_2$ attached to studs $W'_1$, $W'_2$ and shoe $f^2{}_2$ with a spring $W_3$ attached to a stud $W'_3$, the said springs drawing the said shoes away from drum O when the pressure in receiver $i$ is reduced sufficiently.

In operation brake shoe $f^2{}_1$ enters into contact with the drum O and is turned with it. By means of the connecting link $u$ and the pivoted studs $v_1$ and $v_2$ it also carrys with it the shoe $f^2{}_2$ pivoted at $g$ and comes into contact with the drum.

In this embodiment, the shoe $f^2{}_2$ receives both the force exerted by the piston $d'$ of receiver $i$ and the turning force exerted by shoe $f^2{}_1$.

In each of the above described embodiments, the pressure receivers and the parts cooperating therewith are adapted to be assembled on a suitable supporting plate Z disposed at the rear side of drum O.

The arrows indicate the direction of rotation necessary for the drums O in moving forward.

For Fig. 1 this direction is immaterial. For the embodiments of the other two figures it is fixed.

Having thus described my invention what I claim as new and desire to secure by Letters Patent is—

1. In a hydraulic brake mechanism of the type described a brake drum, a pair of brake shoes disposed within said drum, hydraulic means responsive to relatively high pressures interconnecting two of the extremities of said shoes, a pivoted joint for the other extremity of one of said shoes, hydraulic means associated with the other extremity of the other shoe responsive to relatively low pressures, means for supplying said two hydraulic means with fluid under pressure and means normally holding said shoes in an inoperative position with respect to said drum.

2. In a hydraulic brake mechanism of the type described a brake drum, a pair of brake shoes disposed within said drum, a receiver disposed between the extremities of said shoes, a pair of pistons in said receiver, means for connecting said pistons to said shoes at their extremities, means opposing movement of said pistons away from each other, means for introducing a fluid under pressure between said pistons, a pivoted joint for the other extremity of one of said shoes, hydraulic means associated with the other extremity of the other shoe responsive to pressures relatively low with respect to that required by said pair of pistons and a common conduit for supplying said receiver and said hydraulic means with a liquid under pressure.

3. In a hydraulic brake mechanism of the type described a brake drum, a pair of brake shoes disposed within said drum, a receiver disposed between the extremities of said shoes, a pair of pistons in said receiver, means for connecting said pistons to said shoes at their extremities, means opposing movement of said pistons away from each other, means for introducing a fluid under pressure between said pistons, a pivoted joint for the other extremity of one of said shoes, a second receiver disposed opposite the other extremity of the other shoe, a piston in said second receiver, a plunger on said piston adapted to abut the extremity of said last mentioned shoe and a common conduit for supplying said cylinders with a liquid under pressure.

In testimony that I claim the foregoing as my invention, I have signed my name hereto.

MAURICE CHARLES.